United States Patent
Molter et al.

(10) Patent No.: US 6,168,705 B1
(45) Date of Patent: Jan. 2, 2001

(54) ELECTROCHEMICAL GAS PURIFIER

(75) Inventors: Trent M. Molter, Glastonbury; William F. Smith, West Suffield, both of CT (US)

(73) Assignee: Proton Energy Systems, Rocky Hill, CT (US)

(*) Notice: Under 35 U.S.C. 154(b), the term of this patent shall be extended for 0 days.

(21) Appl. No.: 09/149,608

(22) Filed: Sep. 8, 1998

(51) Int. Cl.$^7$ .................................................. C01B 3/50
(52) U.S. Cl. .................... 205/637; 205/763; 205/765; 429/13
(58) Field of Search .................... 205/765, 763, 205/637; 429/13

(56) References Cited

U.S. PATENT DOCUMENTS

| | | |
|---|---|---|
| 3,401,099 | 9/1968 | McEvoy . |
| 4,620,914 | 11/1986 | Abens et al. . |
| 4,664,761 | * 5/1987 | Zupancic et al. ................ 205/637 |
| 4,710,278 | * 12/1987 | Polak et al. ..................... 205/637 |
| 4,797,185 | * 1/1989 | Polak et al. ..................... 205/637 |

FOREIGN PATENT DOCUMENTS

| | | |
|---|---|---|
| 196 15 562 | 4/1996 | (DE) . |
| 0 389 263 | 9/1990 | (EP) . |
| 2 268 322 | 5/1994 | (GB) . |
| WO 99/46032 | 9/1999 | (WO) . |

* cited by examiner

Primary Examiner—Arun S. Phasge
(74) Attorney, Agent, or Firm—Cantor Colburn LLP

(57) ABSTRACT

The electrochemical gas purifier system consists of a cell module with accessory components mounted in a single framework. The module consists of a number of single cells each capable of purifying and ultimately producing hydrogen gas at pressures exceeding 2000 psi. The process comprises introducing a contaminated hydrogen stream to a cell comprising an anode and a cathode with an electrolyte membrane disposed therebetween. The hydrogen is oxidized on the anode to protons which electrochemically migrate across the membrane to the cathode where they recombine with electrons which have passed through an external power source. The contaminants exit the anode side of the cell while the purified hydrogen exits the cathode side of the cell.

3 Claims, 3 Drawing Sheets

ELECTROCHEMICAL GAS PURIFIER

TECHNICAL FIELD

The present invention relates to a hydrogen purification system and process, and especially relates to an electrochemical hydrogen purification process and system.

BACKGROUND OF THE INVENTION

Hydrogen manufacturing typically comprises the reformation of hydrocarbon fuels such as methane, natural gas, methanol, or gasoline. In one process the hydrocarbon fuel is injected into a catalyst bed and heated by steam or other means until the hydrocarbon breaks down to form hydrogen gas and carbon containing gases such as carbon dioxide and carbon monoxide. The product hydrogen must then be separated from these gaseous byproducts as well as excess fuel gases or vapors. This separation typically employs a pressure swing absorption, temperature swing absorption, permeoselective membranes or cryogenic separation.

Product hydrogen is used in many different applications as a process fluid, reactant, or for its special low molecular weight properties. In many of these applications, such as heating, petroleum refining, or food processing, small quantities of resident carbon containing gases or vapors in the hydrogen stream does not constitute a problem. For other applications, such as reducing microelectronic wafers, acting as a carrier gas for laboratory analyses, and as a fuel for fuel cells, the hydrogen purity is very important since the presence of carbon containing contaminants results in deleterious effects on the process and/or system. For these applications, hydrogen is typically purified by passing the hydrogen through thin palladium membranes. This process, which represents a final clean-up step for the hydrogen stream, is very expensive due to the high capital cost of the equipment and process costs.

What is needed in the art is a simple, efficient hydrogen purification process which can be readily employed in various systems.

SUMMARY OF THE INVENTION

The subject of the current invention is an electrochemical device which makes use of a proton exchange membrane to effect a separation of hydrogen from contaminants such as carbon monoxide and carbon dioxide. The method of the present invention for purifying hydrogen comprises: introducing a contaminated hydrogen stream to an anode of an electrochemical cell; applying a voltage across the membrane assembly (anode/membrane/cathode) wherein the voltage is less than that which will cause water electrolysis; oxidizing the hydrogen in the hydrogen stream on said anode to form protons; moving the protons from the anode, across the membrane to the cathode; and recombining the protons to form substantially pure hydrogen gas.

The above description and other features and advantages of the present invention will be appreciated and understood by those skilled in the art from the following description.

BRIEF DESCRIPTION OF THE DRAWINGS

Referring now to the drawings, which are meant to be exemplary, not limiting, and wherein like elements are numbered alike in the several FIGURES.

DETAILED DESCRIPTION OF THE PREFERRED EMBODIMENT

Figure 1:
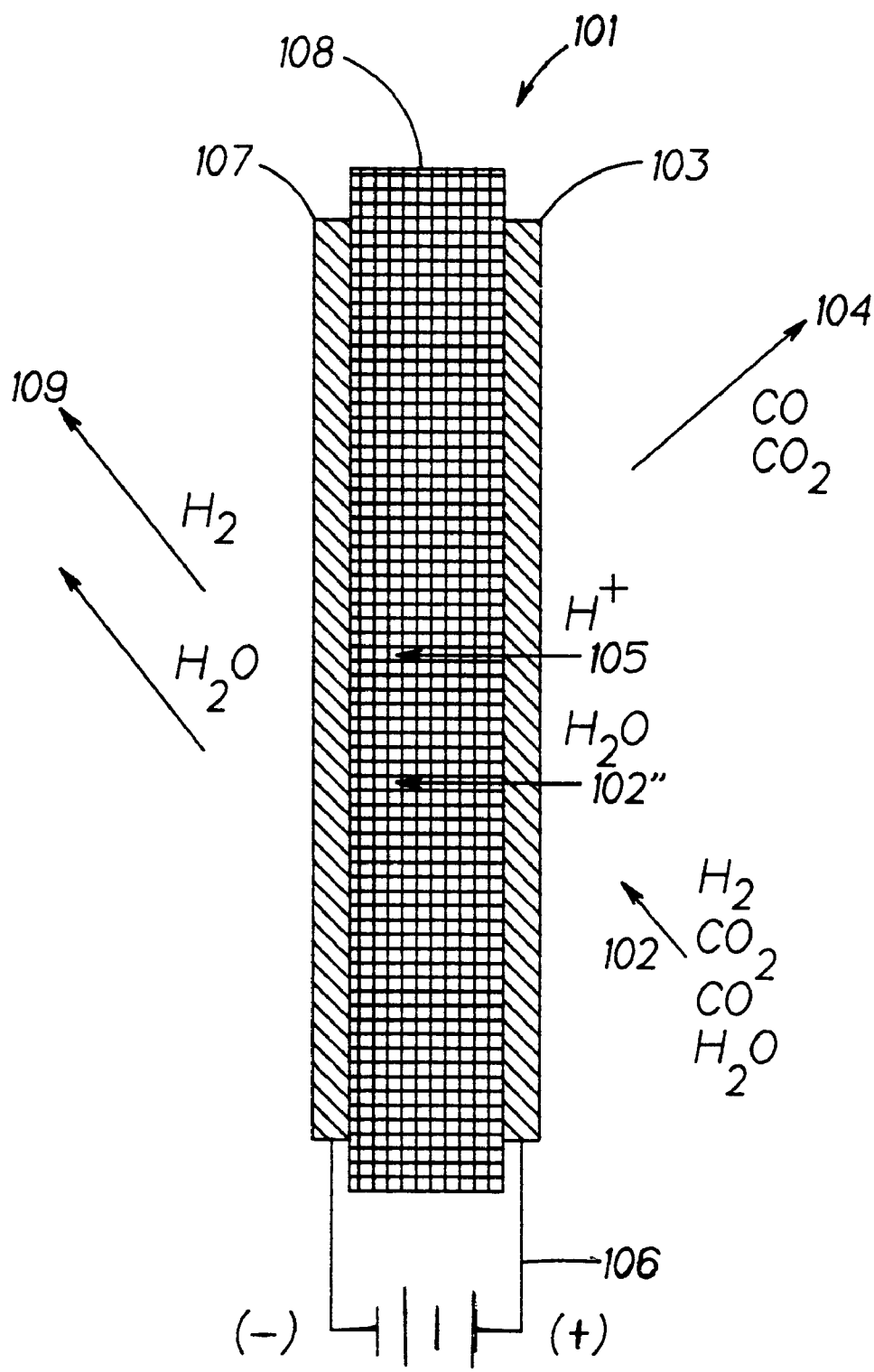
FIG. 1 is a schematic diagram of the electrochemical hydrogen purifier of the present invention.

Referring to FIG. 1, an electrochemical hydrogen purifier 101 comprises: an anode 103, a cathode 107, a proton exchange membrane 108 disposed therebetween, and a power source 106 with the positive terminal connected to the anode 103 and the negative terminal connected to the cathode 107. This purifier can be arranged similar to a conventional electrochemical cell or a bi-polar electrochemical cell. In operation, a contaminated hydrogen stream 102 is introduced to the anode 103 where a voltage of about 1.5 volts or less causes the hydrogen to oxidize forming protons 105 which migrate across the membrane 108 to the cathode 107, while electrons pass through the power source 106. At the cathode 107, the protons 105 and electrons reform hydrogen 109 which is removed from the purifier 101 for use as a high purity hydrogen gas, while the contaminants 104 vent from the purifier 101 or are directed for further processing. The further processing may include removal of water from the hydrogen stream using conventional means, including molecular sieves, thermal processes, condensers, thermal membranes, desiccants, porous plates, among others.

The membrane, which can be a conventional material capable of transporting protons from the anode to the cathode, preferably has a high water concentration, i.e., greater than about 25 volume % water, to enhance ionic mobility of protons. Possible membranes include, but are not limited to, proton exchange membranes such as perfluoroionomers, or other ionomers containing styrene, fluorostyrene, and styrene-divinylbenzene structures, among others, with those having chemically bound sulfonic acid groups preferred due to their high electrochemical pumping efficiency.

The membrane should additionally have sufficient thickness to inhibit leakage of contaminants from one side of the membrane to the other under standard operating conditions. Typically the membrane is up to about 200 mils thick, with a thickness of about 7 mils to about 10 mils preferred for operating conditions comprising a pressure differential of about 400 psi or less, with greater pressures preferably having membranes with a thickness exceeding about 7 mils.

Disposed on each side of the membrane 108 are electrodes, anode 103 and cathode 107, capable of oxidizing and recombining hydrogen, respectively, and having a thickness to provide sufficient catalytic activity to achieve desired performance levels. Possible electrodes include, but are not limited to, finely divided noble metal base electrodes, such as platinum, palladium, ruthenium, chromium, iridium, rhodium, and alloys thereof, typically having a thickness of less than about 1 mil.

Figure 2:
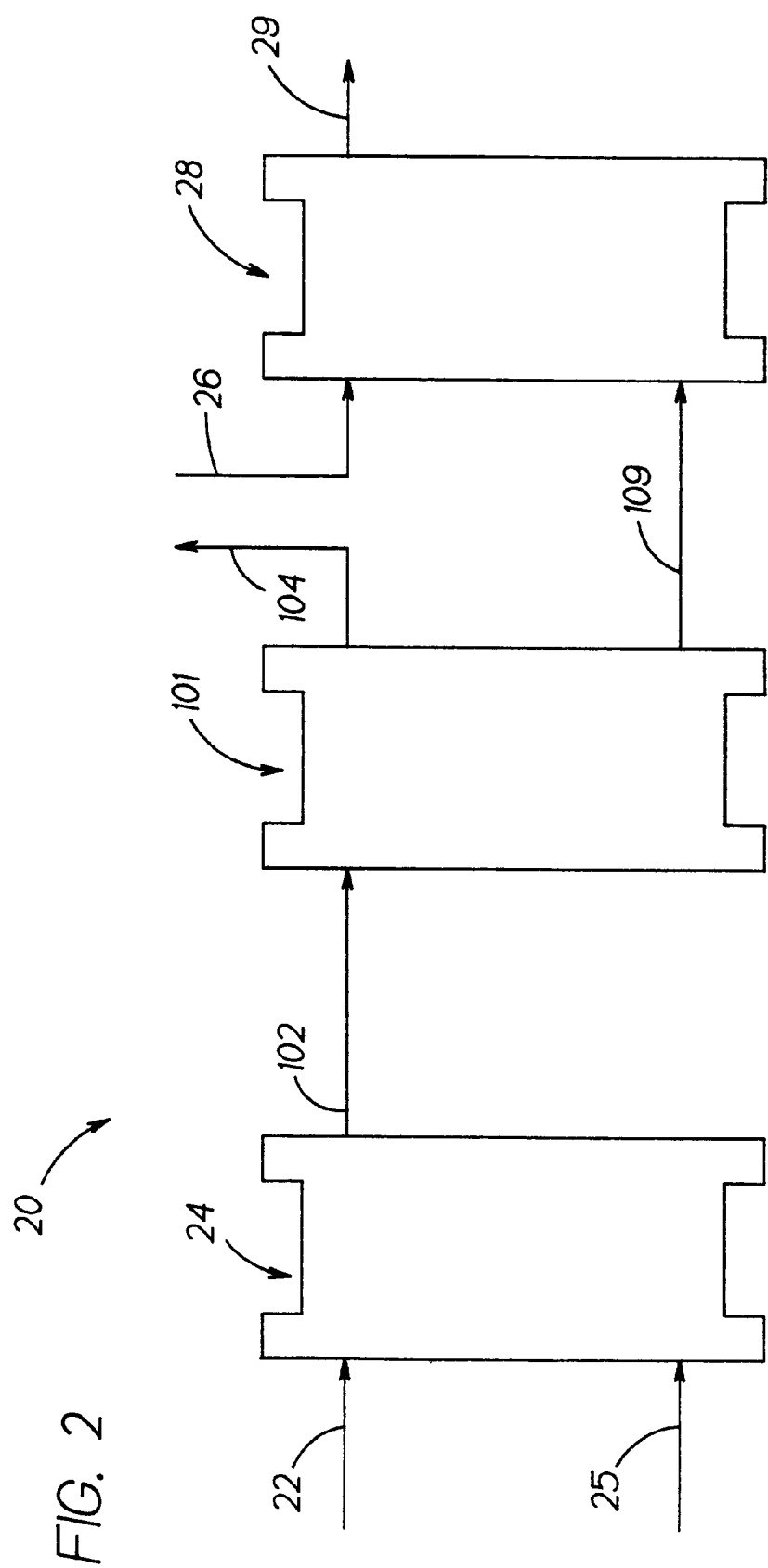
FIG. 2 is a block diagram of a fuel cell system using the electrochemical hydrogen purifier of the present invention.

Referring to FIG. 2, a schematic of a fuel cell system 20 which utilizes an electrochemical hydrogen purifier, liquid or gaseous hydrocarbon fuel 22 together with water 25 converts to hydrogen gas and carbon based byproducts in a reformer 24. The contaminated hydrogen gas stream 102 enters purifier 101 where the carbon contaminants, such as carbon dioxide and carbon monoxide are removed from the hydrogen stream and, if desired, the pressure of the hydrogen stream is increased accordingly. While the carbon contaminant stream 104 vents from the purifier 101, the purified, pressurized hydrogen gas 109 enters fuel cell stack 28 along with an oxidant 26, normally air. Within the fuel cell 28, a controlled recombination of hydrogen and oxygen occurs to produce electric power 29. The benefit of the purification system 101 is that the purified hydrogen gas 109 used in fuel cell 28, enhances the performance and reliability, while reducing maintenance requirements.

Figure 3:
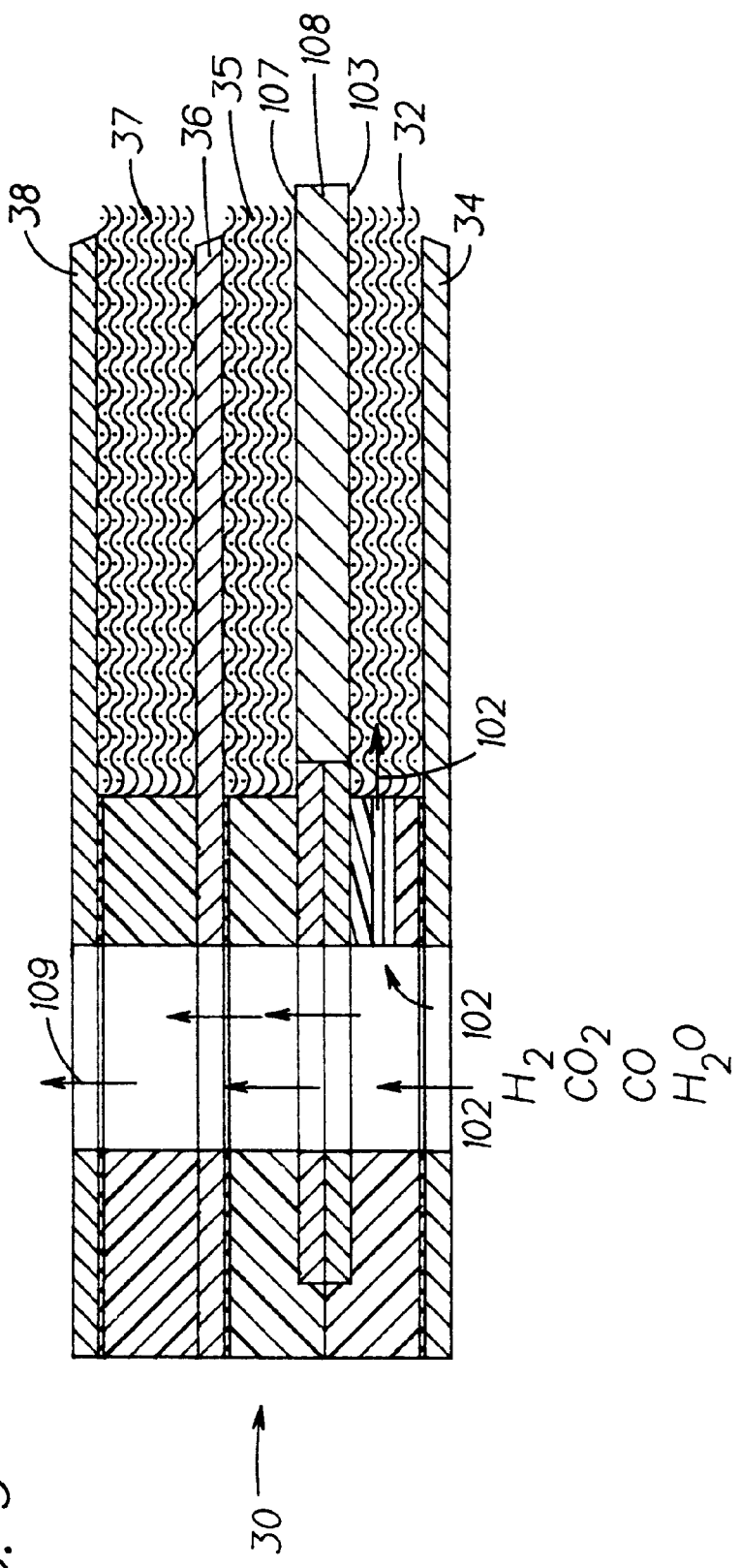
FIG. 3 is a cross sectional view of an electrochemical hydrogen purifier of the present invention.

Now with reference to FIG. 3, a schematic representation of fuel processor module 30 is shown having a membrane 108, an anode 103 and a cathode 107. Screen packages 32, 35, 37 are sandwiched between the anode 103 and separator plate 34, cathode 107 and separator plate 36 and separator plates 36 and 38, respectively. Screens 32, 35 collect current from the anode 103 and cathode 107, while screen 37 serves as a fluids distributor of the coolant water.

Important factors in effectively purifying the hydrogen stream 102, include the voltage applied across the anode/ membrane/cathode assembly, the flow rate of the contaminated hydrogen stream 102, and the hydrogen residence time on the anode 103. During operation the power source 106 applies a sufficient current across the anode/membrane/ cathode assembly to oxidize the hydrogen, forming protons, while not breaking down water contained within the membrane into hydrogen and oxygen gas which would cause membrane dehydration and subsequent inoperability. Typically a voltage of about 1.5 volts or less under standard operating conditions is applied across the assembly with a voltage of about 0.20 to 0.80 preferred. It will be understood by an artisan that under different conditions the voltage which will cause water electrolysis changes. For example, for a cell operating at about 1 atmosphere and 25° C., a voltage exceeding about 1.48 volts will cause water electrolysis, while at higher pressure, a higher voltage is required to induce water electrolysis.

The flow rate of the contaminated hydrogen stream 102 should be sufficiently slow to attain a sufficient residence time on the anode 103 to oxidize the majority of the hydrogen in the hydrogen inlet stream 102, and preferably to oxidize greater than about 85 percent of the hydrogen, with an oxidation of greater than 95 percent of the hydrogen especially preferred. Typically, a hydrogen inlet flow rate in cubic centimeters per minute (cc/min.) is greater than or equal to 7.52 times the total number of amps passed through a cell. For example, a cell having an active area of 1 square foot ($ft^2$) can remove 7520 cc/min. of hydrogen when passing 1000 amperes of current. With an inlet fuel stream which is 60% hydrogen, the unit can process 12533 cc/min. of total gas flow. Residence time is a function of the total number of amps passed through the cell and the concentration of the hydrogen in the inlet stream and total gas flow rate. For a 1 $ft^2$ cell passing 1000 amps of current, the residence time should be greater than 0.25 min. for a total hydrogen flow rate of 7520 cc/min.

In the case of some proton exchange membrane fuel cells which operate with reformed hydrocarbon fuels, trace carbon-bearing contaminants, such as carbon monoxide, absorb onto the anode, masking the active area of the cell. An analogous mechanism can occur with the electrochemical gas purifier, eventually rendering the purifier ineffective and/or inefficient. Consequently, periodic current reversal for short time periods of less than about a minute, with about 10 seconds to about 40 seconds preferred, effectively desorbs the adhering contaminants, resulting in a clean electrode surface.

In the case where substantially complete hydrogen recovery is important, i.e., possibly aerospace applications, and/or where purification of the non-hydrogen components, i.e., carbon monoxide, carbon dioxide, etc., is important, a multi-cell purifier arrangement with the cells operated in series, can be employed. In this arrangement, due to decreased hydrogen content, it is preferred to operate subsequent cells at a lower current density than previous cells in order to facilitate hydrogen ion transport across the membrane of the cell. For example, a two cell stack with each cell having an active area of 1 $ft^2$, with a 60% hydrogen stream flowing at a rate of approximately 138000 cc/min., in order to recover about 100% of the hydrogen, the stack can be operated at a 1,000 $amp/cm^2$ current density across the first cell and a 100 $amp/cm^2$ current density across the second cell. This arrangement will recover about 91% of the hydrogen in the first cell, and about all of the remaining hydrogen in the second cell, thereby recovering about 100% of the overall hydrogen.

The purifier of the present invention is a simplified, efficient, cost effective manner of purifying, and if desired, pressurizing hydrogen for commercial use. This system enables: (1) the production of pure hydrogen (i.e., greater than 99.9999% pure) via the separation of hydrogen from carbon containing gases; (2) a controlled hydrogen output by adjusting the current applied to the purifier enabling consumption of a metered flow of hydrogen (this is typical of an automotive fuel cell application whereby hydrogen rate must be metered based on load demand); (3) the generation of hydrogen gas at the desired pressure; and (4) a commonality of environment and hardware exist with electrochemical systems, particularly with proton exchange membrane cells.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for purifying a hydrogen stream comprising:

introducing a contaminated hydrogen stream to an anode of an electrochemical cell having said anode, a cathode, and an electrolyte membrane therebetween, to form a membrane assembly, said contaminated stream having hydrogen and at least one contaminant;

applying a voltage across said membrane assembly, wherein said voltage is below an electrolysis voltage which causes water electrolysis under operation conditions of the membrane assembly;

oxidizing said hydrogen on said anode to form protons;

moving said protons from said anode, across said membrane to said cathode; recombining said protons to form a recombined hydrogen stream; and reversing said voltage across said membrane assembly to desorb carbon compounds from said anode.

2. A method for purifying a hydrogen stream comprising:

introducing a contaminated hydrogen stream to an anode of an electrochemical cell having said anode, a cathode, and an electrolyte membrane therebetween, to form a membrane assembly, said contaminated stream having hydrogen and at least one contaminant;

applying a voltage across said membrane assembly, wherein said voltage is below an electrolysis voltage which causes water electrolysis under operation conditions of the membrane assembly;

oxidizing said hydrogen on said anode to form protons;

moving said protons from said anode, across said membrane to said cathode; recombining said protons to form a recombined hydrogen stream;

removing said contaminated stream from said electrochemical cell as an effluent stream;

introducing said effluent stream to a second anode of a second electrochemical cell having said second anode, a second cathode and a second electrolyte membrane therebetween to form a second membrane assembly;

oxidizing hydrogen in said effluent stream on said second anode to form second protons;

moving said second protons from said anode, across said second membrane assembly to said second cathode; and recombining said second protons to form additional hydrogen, wherein said first electrochemical cell and said second electrochemical cell form a bipolar cell stack.

3. A method for purifying a hydrogen stream comprising:

introducing a contaminated hydrogen stream to an anode of an electrochemical cell having said anode, a cathode, and an electrolyte membrane therebetween, to form a membrane assembly, said contaminated stream having hydrogen and at least one contaminant;

applying a voltage across said membrane assembly, wherein said voltage is below an electrolysis voltage which causes water electrolysis under operation conditions of the membrane assembly;

oxidizing said hydrogen on said anode to form protons;

moving said protons from said anode, across said membrane to said cathode; recombining said protons to form a recombined hydrogen stream;

removing said contaminated stream from said electrochemical cell as an effluent stream;

introducing said effluent stream to a second anode of a second electrochemical cell having said second anode, a second cathode and a second electrolyte membrane therebetween to form a second membrane assembly;

oxidizing hydrogen in said effluent stream on said second anode to form second protons;

moving said second protons from said anode, across said second membrane assembly to said second cathode; and recombining said second protons to form additional hydrogen, wherein said electrochemical cell and said second electrochemical cell are operated at different current densities.

* * * * *

UNITED STATES PATENT AND TRADEMARK OFFICE
CERTIFICATE OF CORRECTION

PATENT NO. : 6,168,705 B1
DATED : January 2, 2001
INVENTOR(S) : Molter et al.

It is certified that error appears in the above-identified patent and that said Letters Patent is hereby corrected as shown below:

Drawings,
Figure 1, Sheet 1, delete "102"" and insert therefor -- 102 --

Column 1,
Line 26, after "stream" delete "Does" and insert therefor -- do --

Column 3,
Line 28, before "will" delete "which"

Signed and Sealed this

Twenty-eighth Day of September, 2004

JON W. DUDAS
*Director of the United States Patent and Trademark Office*